(12) United States Patent
Fletcher

(10) Patent No.: US 10,235,143 B2
(45) Date of Patent: *Mar. 19, 2019

(54) GENERATING A PREDICTIVE DATA STRUCTURE

(71) Applicant: International Business Machines Corporation, Armonk, NY (US)

(72) Inventor: Benjamin J. Fletcher, London (GB)

(73) Assignee: International Business Machines Corporation, Armonk, NY (US)

( * ) Notice: Subject to any disclaimer, the term of this patent is extended or adjusted under 35 U.S.C. 154(b) by 89 days.

This patent is subject to a terminal disclaimer.

(21) Appl. No.: 15/352,787

(22) Filed: Nov. 16, 2016

(65) Prior Publication Data

US 2017/0060549 A1    Mar. 2, 2017

Related U.S. Application Data

(63) Continuation of application No. 14/351,178, filed as application No. PCT/IB2012/055429 on Oct. 8, 2012, now Pat. No. 9,557,966.

(30) Foreign Application Priority Data

Oct. 12, 2011  (GB) .................................. 11184879.2

(51) Int. Cl.
*G06F 9/44*      (2018.01)
*G06F 8/41*      (2018.01)
(Continued)

(52) U.S. Cl.
CPC .................. *G06F 8/43* (2013.01); *G06F 8/30* (2013.01); *G06F 9/44521* (2013.01)

(58) Field of Classification Search
CPC ........... G06F 8/30; G06F 8/43; G06F 9/44521
(Continued)

(56) References Cited

U.S. PATENT DOCUMENTS 7,222,161 B2    5/2007   Yen et al.
7,631,214 B2    12/2009  Bockhold et al.
(Continued)

FOREIGN PATENT DOCUMENTS

CN    1758246 A      4/2006
CN    101529415 A    9/2009
CN    101689232 A    3/2010

OTHER PUBLICATIONS

Pan, "Research and Implementation of Web Application Support Offline Processing Based on Flex", CNKI, Computer Science, Jul. 2008. http://en.cnki.com.cn/Article_en/CJFDTOTAL-JSJA200807085.htm Last accessed Aug. 18, 2016. 2 pages.
(Continued)

*Primary Examiner* — Li B. Zhen
*Assistant Examiner* — Hui-Wen Lin
(74) *Attorney, Agent, or Firm* — Stosch Sabo

(57) ABSTRACT

A method, apparatus, and/or computer program product generates a predictive data structure for an application when operating offline in a network connected data processing system, the application comprising source code having an execution path. The method comprises: determining an exit point within the source code of the application; determining, from the exit point, an execution path comprising at least one conditional statement; identifying one or more branches of the at least one identified conditional statement and for each identified branch determining an expected response; for each determined expected response, generating a data structure from the response; continuing along the execution path of the source code from the exit point and replacing each request for a resource in the source code with a pointer to the generated data structure; and executing the source code with the pointer to the generated data structure from the determined exit point.

16 Claims, 9 Drawing Sheets

(51) Int. Cl.
*G06F 9/445* (2018.01)
*G06F 8/30* (2018.01)

(58) Field of Classification Search
USPC ......................................................... 717/106
See application file for complete search history.

(56) References Cited

U.S. PATENT DOCUMENTS

| | | | |
|---|---|---|---|
| 7,779,394 | B2 | 8/2010 | Homing et al. |
| 7,814,234 | B2 | 10/2010 | Hawkins et al. |
| 2002/0073076 | A1 | 6/2002 | Xu et al. |
| 2003/0126134 | A1* | 7/2003 | Messing ............ G06F 17/30899 |
| 2004/0243587 | A1* | 12/2004 | Nuyens ...................... G06F 8/31 |
| 2005/0243020 | A1 | 11/2005 | Steeb et al. |
| 2006/0195577 | A1 | 8/2006 | Tsuji |
| 2007/0033155 | A1* | 2/2007 | Landsman ........ G06F 17/30899 |
| 2008/0040484 | A1 | 2/2008 | Yardley |
| 2008/0104195 | A1 | 5/2008 | Hawkins et al. |
| 2008/0222628 | A1* | 9/2008 | Batra ........................ G06F 8/60 717/171 |
| 2010/0138485 | A1 | 6/2010 | Chow et al. |
| 2010/0262839 | A1 | 10/2010 | Eker et al. |
| 2010/0281310 | A1 | 11/2010 | Hou et al. |
| 2014/0130178 | A1 | 5/2014 | Agrawal et al. |
| 2014/0282374 | A1 | 9/2014 | Fletcher |

OTHER PUBLICATIONS

International Search Authority—International Search Report and Written Opinion for International Application No. PCT/IB2012/055429, dated Mar. 7, 2013. 8 pages.
Fletcher, "Generating a Predictive Data Structure", Application No. 11184879.2. Filed Oct. 12, 2011. 22 pages.
Fletcher, "Generating a Predictive Data Structure", Application No. PCT/IB2012/054962. Filed Sep. 19, 2012. 23 pages.

* cited by examiner

GENERATING A PREDICTIVE DATA STRUCTURE

BACKGROUND

The invention relates to the field of networked data processing systems. In particular, the invention relates to a method and an apparatus for generating a predictive data structure for an application when the application is operating offline.

Internet users access services provided by internet service providers for performing interactions such as personal banking, purchasing goods online, information retrieval or for launching other services from within a service provider's online environment.

In order to access online services users operate client devices for sending requests to a server in order to request access to resources provided by one or more applications.

A server receives requests for resources and returns the requested resources to the requesting client device. Typically, Hypertext Transfer Protocol (HTTP) is deployed which defines the means in which a client device interacts with one or more servers across the internet. HTTP is a 'request-reply' protocol in which the client sends a request message to the server containing the URL of the required resource. The server looks up a pathname and, if it exists, sends back the resource in a reply to the client. HTTP allows for content negotiation and authentication.

The above type of interaction works well as long as the client and the server can continually communicate with each other i.e. sending requests for resources and receiving back from the server the requested resource. This request reply interaction relies on an open and continual communication path across the network.

A problem arises when the network, for whatever reason, is temporarily unavailable. The consequence of the network being unavailable is that a transaction is unable to complete. Often, at this point, the application which is used to request the one or more resources, typically a web browser, moves in to an operational state termed 'working offline'. When working in 'offline' mode scripts and/or HTML embedded in a web page are unable to execute because the software needs to make a call to a server in order to load further data.

A typical solution to the above problem is to cache the requested resource i.e. the web page. However, a drawback with this approach is that the cached copy of the resource may comprise 'out of date' data and thus produce incorrect results, or there may be no cached version because of security or privacy reasons.

SUMMARY

A method, apparatus, and/or computer program product generates a predictive data structure for an application when operating offline in a network connected data processing system, the application comprising source code having an execution path. The method comprises: determining an exit point within the source code of the application; determining, from the exit point, an execution path comprising at least one conditional statement; identifying one or more branches of the at least one identified conditional statement and for each identified branch determining an expected response; for each determined expected response, generating a data structure from the response; continuing along the execution path of the source code from the exit point and replacing each request for a resource in the source code with a pointer to the generated data structure; and executing the source code with the pointer to the generated data structure from the determined exit point.

BRIEF DESCRIPTION OF THE SEVERAL VIEWS OF THE DRAWINGS

A preferred embodiment of the present invention will now be described by way of example only, with reference to the accompanying drawings in which.

DETAILED DESCRIPTION

Figure 1:
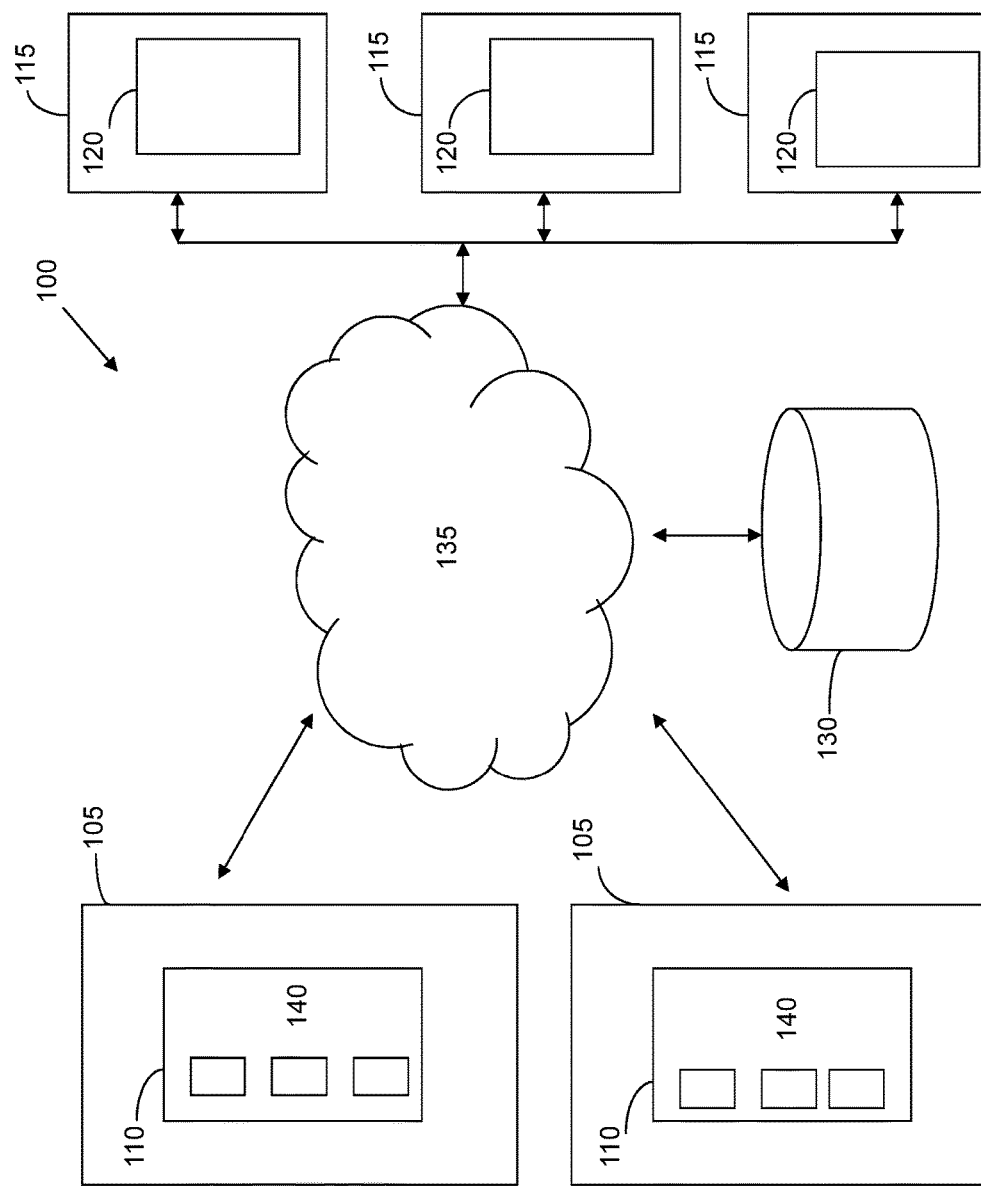
FIG. 1 is a block diagram detailing a networked data processing environment in which a preferred embodiment of the present invention may be implemented.

With reference now to the figures, FIG. 1 depicts a pictorial representation of a network data processing system 100 in which preferred embodiments of the invention may be implemented. A network data processing system 100 comprises a network 135 which is the medium used to provide communication links between various devices connected together within the network data processing system 100. The network 135 may comprise communication structures such as wired links (Ethernet), wireless communication links or fiber optics etc.

In the depicted example of FIG. 1, servers 105 connect to the network 135 along with storage means 130. The servers 105 may be any type of servers, for example, application severs or web severs etc. Client devices 115 also connect to the network 135. These clients 115 may be, for example, personal computers, mobile devices, hand-held devices, network connected terminal devices or any type of device that is capable of sending requests for resources 140 and receiving the resources 140 from network connected servers 105. Resources 140 can take the form of a web page, information resources, data, an online application and their underlying formats such as markup languages i.e. HTML files, XML files, and scripting languages such as JavaScript files, data files and payloads etc. Clients 115 typically deploy a network application 120 such as a web browser in order to request resources 140 from one or more servers 105. Storage means 130 stores resources for sending to requesting clients 115.

In another embodiment not depicted in the figures, client devices are connected in a peer to peer fashion and therefore clients can themselves become servers.

Network data processing system 100 may comprise additional servers, clients and other communication devices which are not illustrated in the figures.

Network data processing system 100 may take the form of the Internet with network 130 representing a worldwide collection of networks and gateways that use the Transmission Control Protocol/Internet Protocol (TCP/IP) suite of protocols to communicate with one another. Likewise, network 135 may also take the form of a local area network or a wide area network etc. FIG. 1 is intended as an example, only and not as an architectural limitation for different embodiments.

Figure 2:
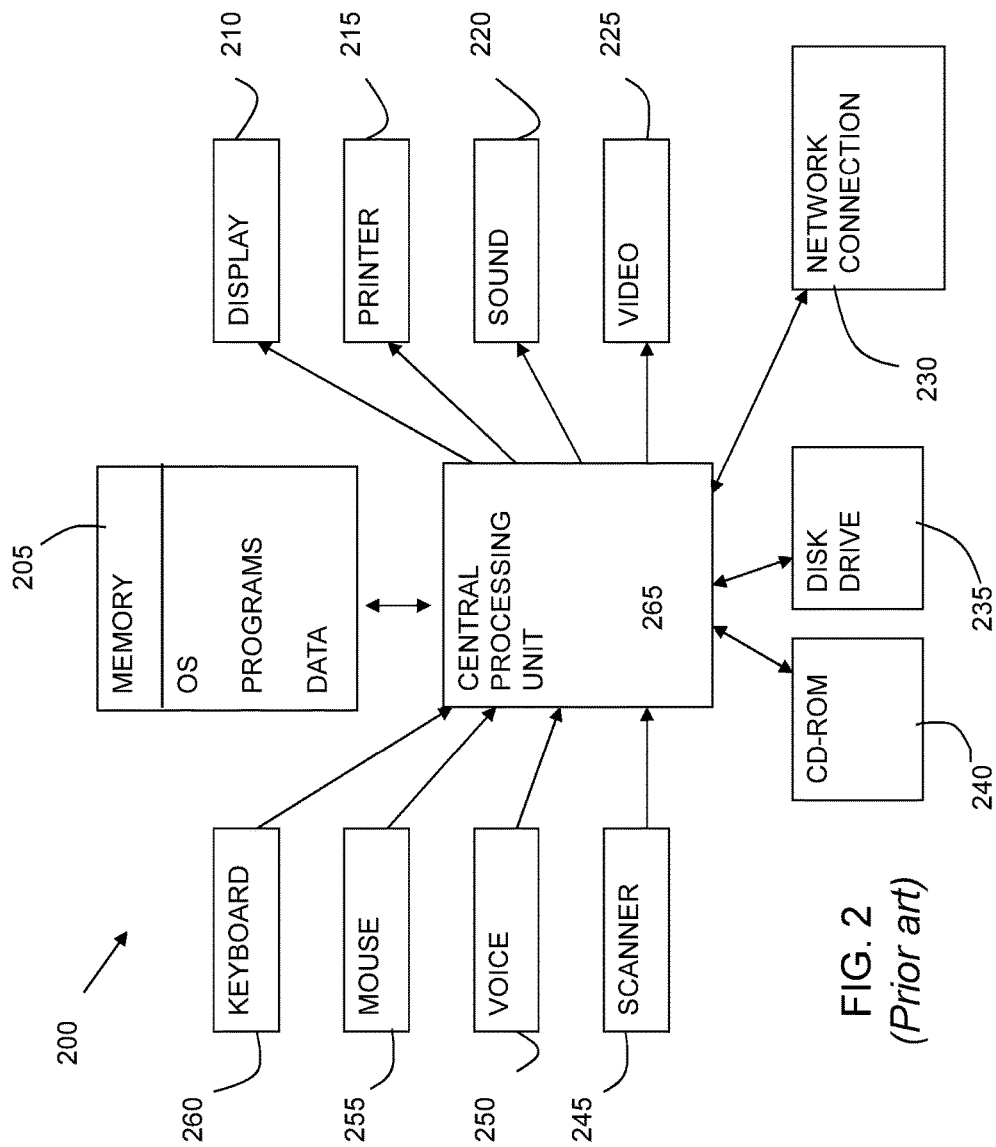
FIG. 2 is a block diagram detailing a data processing system in which a preferred embodiment of the present invention may be implemented.

FIG. 2 illustrates a pictorial illustration of data processing system 200. Data processing system 200 is an example of a computer, such as a server 105 or client 115 of FIG. 1.

The data processing system 200 comprises a central processing unit 265 with primary storage in the form of memory 205 (RAM and ROM). Memory 205 stores program information and data acted on or created by application programs. Program information comprises the operating system code for the data processing system 200 and application code for applications running on the data processing system 200. Secondary storage 235 comprises, for example, optical disk storage and magnetic disk storage. Data and program information can also be stored and accessed from the secondary storage 235.

Data processing system 200 comprises a network connection means 230 for interfacing the data processing system 200 to a network 135. The data processing system 200 may also have other external source communication means such as a fax modem or telephone connection.

The central processing unit 265 comprises inputs in the form of, as examples, a keyboard 260, a mouse 255, voice input 250, and a scanner 245 for inputting text, images, graphics or the like. Outputs from the central processing unit 265 may comprise a display means 210, a printer 215, sound output 220, video output 225, etc. Applications may run on the data processing system 200 from a storage means 235 or via a network connection 230.

In a preferred embodiment application code comprises code for running a network application 120 for accessing online applications 110 such as wikis, social networking sites and communication tools etc. For clarity, the network application 120 is any application that is operable for requesting, receiving, presenting and traversing information resources 140 from the network 135. The network application 120 may take the form of a browser application which is running on a client, but is not limited to such applications. For clarity, the term online application is intended to encompass any information resource 140 that is accessed from the network 135 in an interaction between a client 115 and a server 105. This form of interaction can take the form of an HTTP request or other like protocol. A person skilled in the art will realise that an on-line application 110 may be offline because of one or more resources are not available from one or more servers 105. Thus, resulting in an application 110 which is only partly online because some resources 140 are available and some resources 140 are not available due to selective availability of one or more servers 105.

A key problem encountered when using a network application 120 as a platform to run online applications is loss of network connectivity during execution of online applications 110. Thus, when a client 115 is accessing an online application 110 that requires a user of a client to input data and the client looses connectivity with the online application 110, the client 115 is no longer able to complete the transaction and the online application operates in an offline mode. A requested resource can be any item of data which is requested by the client 115 from the server 105.

The impact of a loss of connectivity often results in loss of data and loss of functionality. This results in the client 115 having to exit out of the online application 110 and retrying when connectivity with the server 105 has been resumed. Often, when the network application is operating in an offline mode the source code of the application is still not able to execute because HTTP requests can not be made to the server for resources that are requested by calls in the source code.

Figure 3:
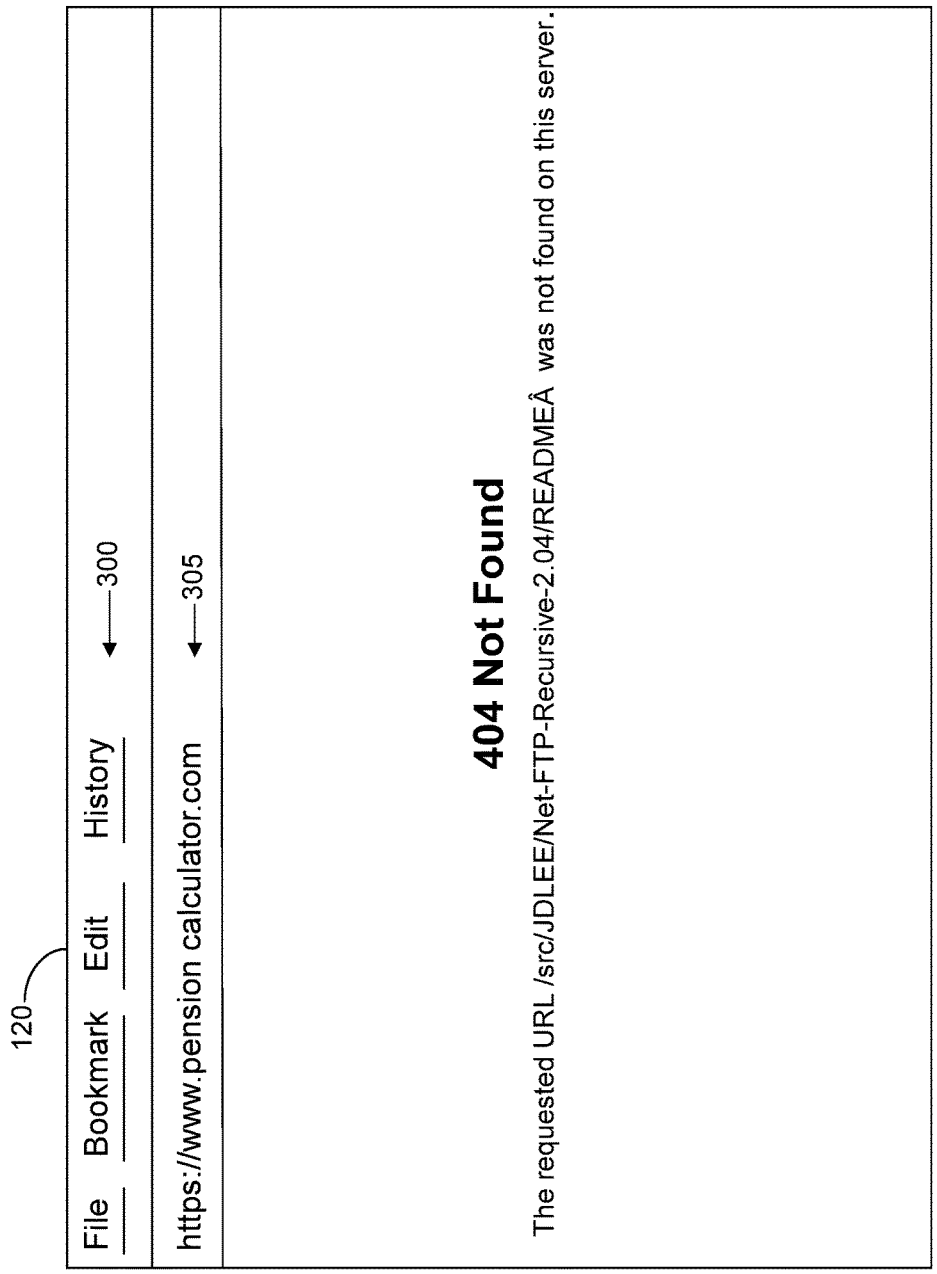
FIG. 3 is a block diagram detailing an example of an offline application in accordance with a preferred embodiment of the present invention.

FIG. 3 is an example of a web browser application 120. The web browser application comprises menus 300 in which user's can access functionality which is specific to the web browser application 120. The web browser application also comprises a navigation tool bar 305 in which user's can enter an address (URL) of a resource to be accessed. In this example, the user has entered the URL www.pensioncalculator.com. Each URL translates into an IP address of a location of the resource of a server. Using the HTTP protocol, a request is sent to the server requesting access to the pension calculator application ('the resource'). As long at the client 115 and the server 105 are in network communication, the server 105 can a) receive the request from the client 115 and b) send the requested resource back to the client 115. If the client 115 and the server 105 are not connected, the network application displays '404 Not Found' message.

A person skilled in the art will realise that the server 105 which received the request may be network connected to the client 115 in a 'one to one' relationship and therefore can send the requested resource back to the client. However, if the server 105 does not hold the requested resource and the requested resource resides on a second server 105 and the second server has lost network connectivity with the server, the client's request cannot be fulfilled.

Figure 4:
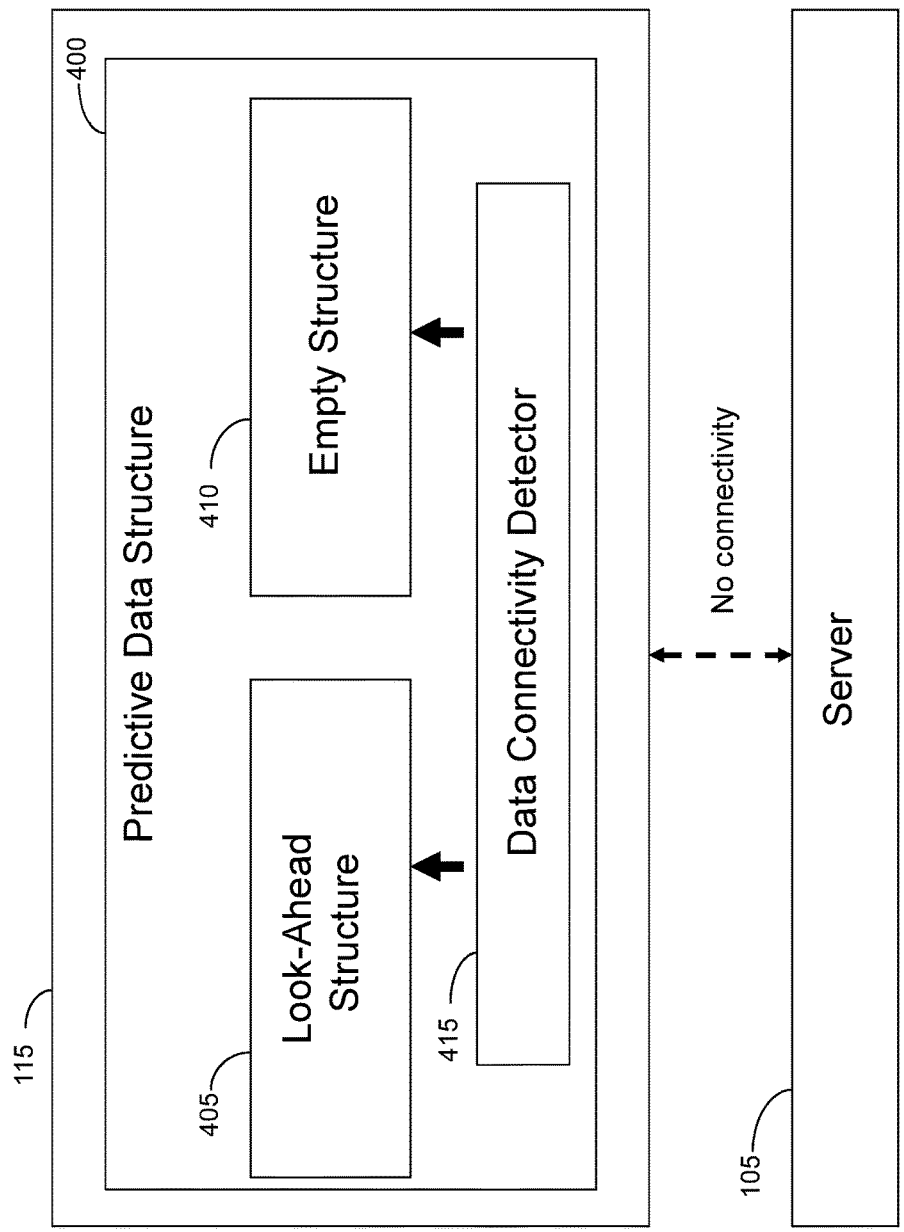
FIG. 4 is a block diagram depicting a predictive data structure component in accordance with a preferred embodiment of the present invention.

In order to solve the above problem and in accordance with a preferred embodiment, FIG. 4 depicts a predictive data structure component 400. The predictive data structure component 400 is operable with a network application 120 as in known in the art. The predictive data structure component 400 may be embedded with a network application 120 or may be installed as a plug-in to an existing network application 120.

The predictive data structure component 400 comprises logic for detecting when a client 115 and server 105 is no longer network connected. In response to detecting a loss of network connectivity, the predictive data structure component generates a data structure that is required by the source code of the application in order for source code to continue executing and provide the intended functionality. The data structure that is created is a replica of the data structure that would have been created by the source code if the server 105 and the client 115 were communicating over the network 135. The predictive data structure component 400 determines what resources are required by the source code in order for the source code to execute and complete. By predicting which data structures are required the predictive data structure component 400 can create the data structures and modify the source code references to the server side resources to point to the created data structures stored on the client 115. Therefore, after the source code references have been modified in the source code, the source code can continue along its execution path and execute as if it were network connected. Therefore, to the user, it would appear as if the client 115 and the server 105 where still network connected.

In accordance with a first embodiment, a data connectivity detector component 415 located on the client 115 continually monitors HTTP requests for resources 140. On detecting that a client 115 request has timed out or a client 115 receives an HTTP 404 error code, the data connectivity detector component 415 sends a message to the predictive data structure component 400.

The predictive data structure component 400 comprises a number of components that interact with each other in order to provide ongoing functionality to an offline application i.e. thus giving the impression that the application is on-line.

The predictive date structure component 400 employs two techniques to achieve this. One is an 'empty' data structure creator 410 and the other is a 'look ahead' data structure creator 405. The aim of both predictive data structure components 405, 410 is to provide on going functionality by recreating data structures required by the offline application when connectivity has been lost between the client 115 and the server 105.

Figure 5:
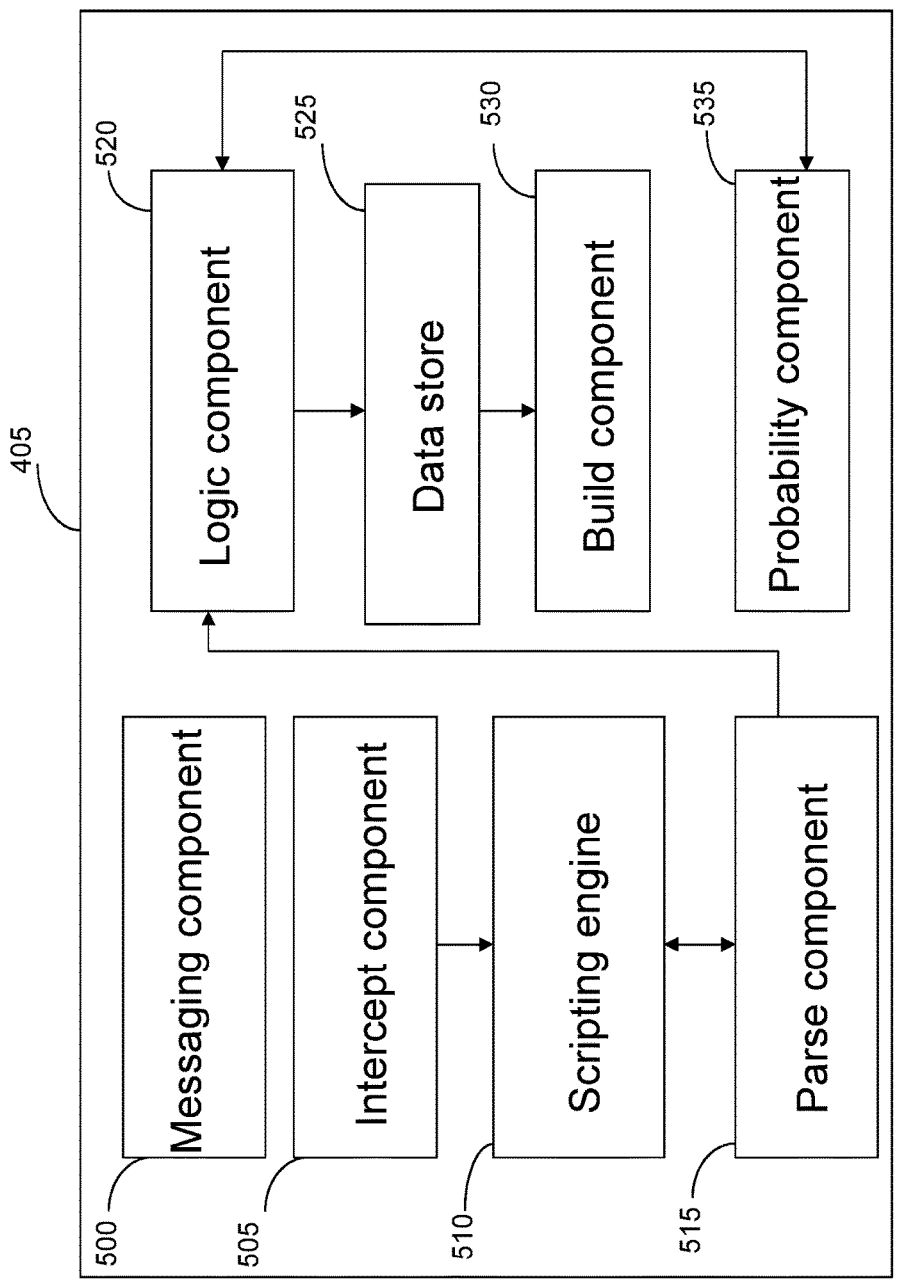
FIG. 5 is a block diagram detailing the components of a look-ahead data structure component of the predictive data structure component of FIG. 4, in accordance with a preferred embodiment of the present invention.
Figure 6:
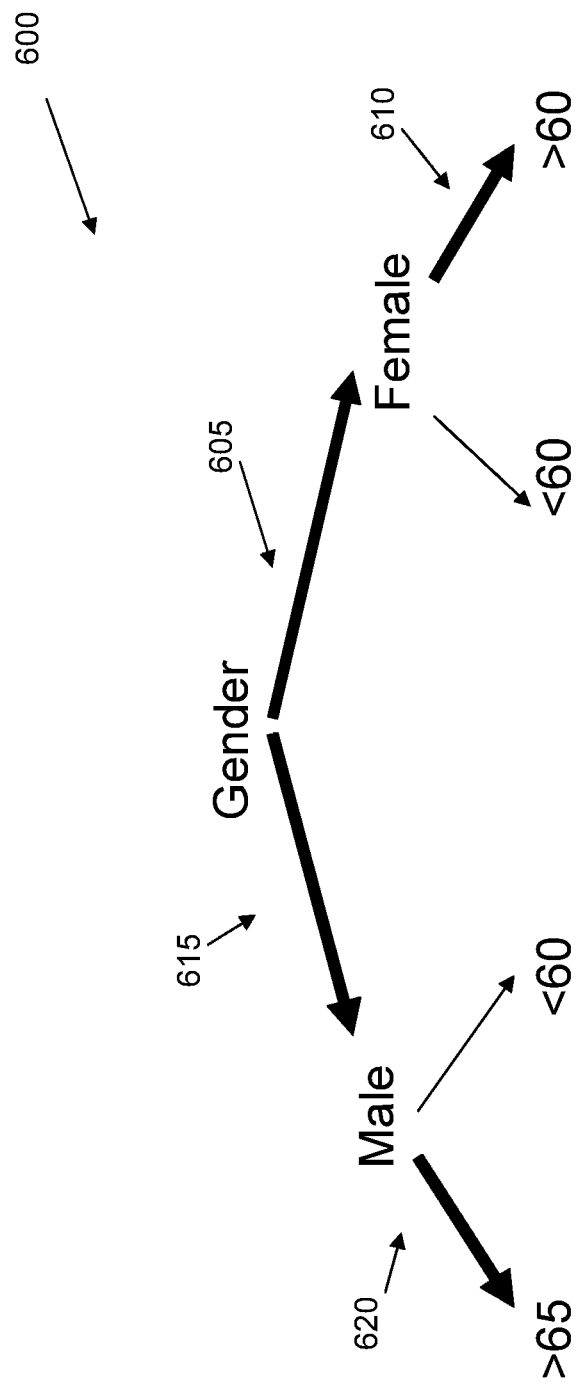
FIG. 6 is an illustration of an execution path in accordance with a preferred embodiment of the present invention.
Figure 8:
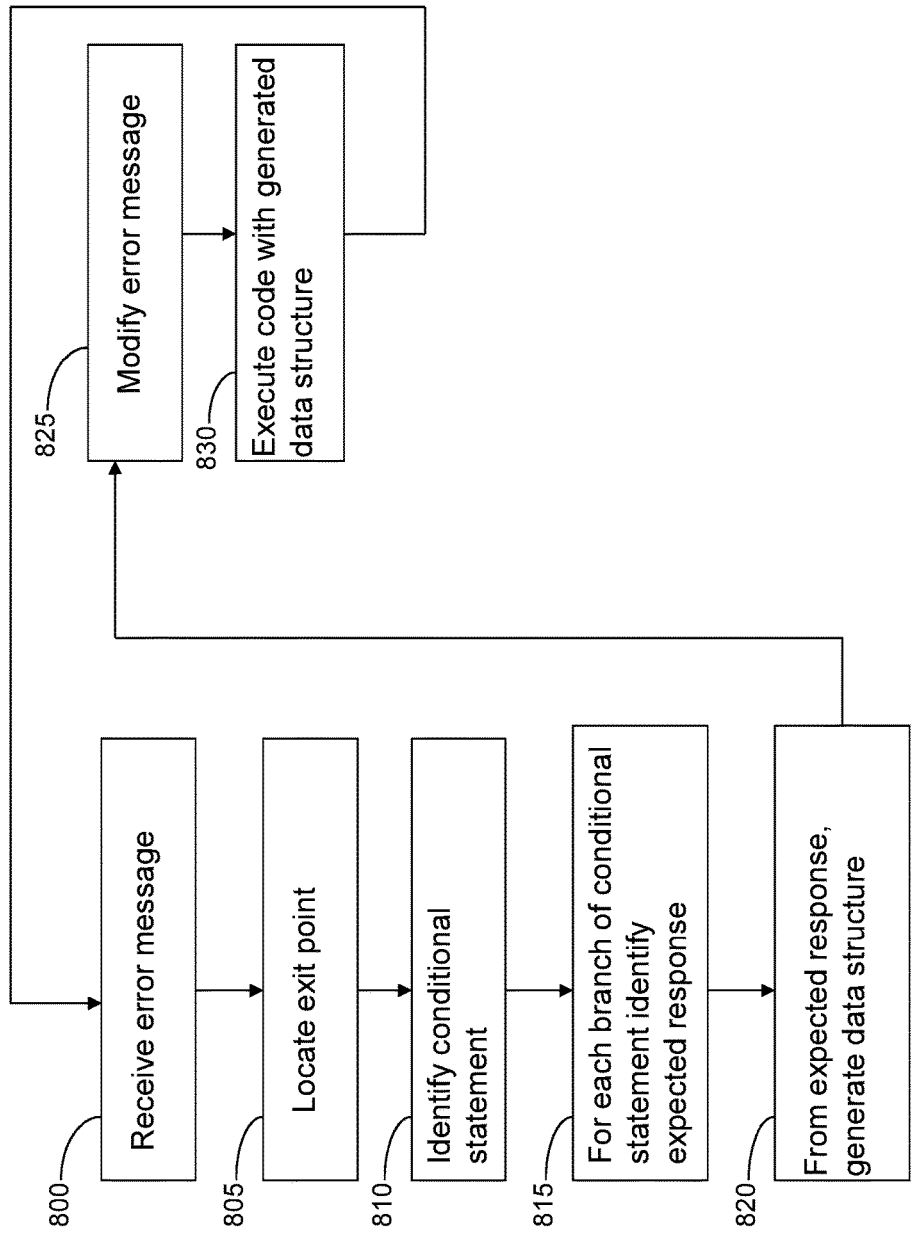
FIG. 8 is a flow chart detailing the process steps of the look-ahead data structure component in accordance with a preferred embodiment of the present invention.

With reference to FIG. 5, FIG. 6 and FIG. 8, the look-ahead data structure creator component 405, receives a message (step 800), via a message receiver component 500, informing of a loss of network connectivity. This message can take the form of a 'resource failure' message, such as an HTTP 404 response.

An interceptor component 505 accesses and intercepts the source code of the application 110 that is running on the client 115. The interceptor component 505 begins by determining where in an execution path the logic has requested a network resource (for example which specific line of code). This point is termed as an 'exit point' 615 (step 805) because the flow of execution can not proceed any further due to a lack of network connectivity. An execution path is the order in which the lines of source code of the application execute in order to provide the functionality of the online application. For example, the network application 120 sends a request to access www.pensioncalculator.com. The server 105 fetches the requested resource 140 and sends the resource to the client 115. The client 115 receives the resource 140 and the network application 120 displays a question (please enter your gender) which requires data input by the user. The user enters their gender 'female' and the execution path dictates that based on the response of 'female' a specific set of questions should be presented to the user. If at this point in the execution path network connectivity is lost between the client 115 and the server 105, this is termed the 'exit point'.

On location of an exit point in the execution path, the interceptor component 505 modifies and copies the source code into a memory store and sends a call to a scripting engine 510. The scripting engine 510 in combination with a parsing component 515 parses the source code stored in memory beginning with the first identified data structure before the exit point. This is because the scripting engine has to identify a) what is the current data structure being displayed to the user and b) the execution path that the data structure needs to follow depending on user input. The scripting engine 510 begins by identifying a first conditional statement in the source code (step 810). A conditional statement may take the form of 'if this, then else', for example, if a value of X is greater than the value of Y, perform a specific action, based on a positive determination perform an action etc.

On identification of a conditional statement such as an 'IF' statement, the scripting engine generates a data element that will satisfy a branch of the IF statement (step 815). To explain this concept further, an example of an on-line application called 'pension calculator' will be used.

On launching the on-line application called 'pension calculator' by a user, the user may presented with a 'home page'. The home page provides details about the on-line application and the information that the on-line application requires from the user in order to compute a final calculation. At this point in time the client 115, that the online application is accessed from, has network connectivity to the server 105.

The user selects an option on the home page to launch the pension calculator. An HTTP request is sent to the server 105 to fetch the next page to be displayed to the user on the client 115. The interceptor component 505 is continually working in the background monitoring the status of the network connectivity between the client 115 and the server 105.

As long as there is network connectivity, the client 115 will receive requested resources 140 and the server 105 will receive the request for the resources 140 and fetch the resources 140 from where ever the resources 140 are located in the network 135. If, at this point the interceptor component 505 identifies no connectivity a message is sent to the scripting engine 510 instructing it to begin parsing the source code of the off-line application 110.

As an example, if the next page that is to be displayed to the user is a 'drop down' box instructing the user to select their gender, typically, the user would select the drop down box and enter their gender and a request would be sent to the server 105 requesting the fetching of the 'person.gender' data set. However, if there is no network connectivity, the request for the 'person.gender' data set is not received by the server 105, the client's request can not be fulfilled and the request times out.

Therefore in accordance with an embodiment of the present invention, the scripting engine 510 identifies the exit point in the logic flow and notes the 'person.gender' data set is required.

The scripting engine 510 generates data elements that will satisfy the conditional statement in order to generate the data structure as if the client and the server are network connected. The scripting engine 510 interfaces with a logic component 520, which itself comprises conditional statements in the form of rules in order to test and validate each branch of the conditional statement. By testing and validating each branch of the conditional statement with variables, the data structure can be generated. For example, if a conditional statement is 'if person age=>65 then display data set 'X''.

The logic component 515 tests and validates the conditional statement to identify data set 'X'. Once validated variable data set 'X' becomes part of the generated data structure. By modifying the source code of the application, the generated data structure is used, instead of having to request the resource from the server 105 which is not in network communication with the client 115. Therefore, the scripting engine 510 tests and validates every possible branch of a conditional statement, for example if there are five possible execution paths, each execution path having executing source code, then there will be five sets of data structures. A person skilled in the art will realise that there each of the five sets of data structures may have overlapping data which is common to each of the five data sets.

A further example is as follows:
Data structure
Person={gender: ???}
The conditional statement may state the following:

---

IF (person.gender ===="female" && person.age >60){
presentPensionQuestions( );
}      else if (person.gender ==="male" && person.age>65){
presentPensionQuestion( );
}

---

The scripting engine 510 interfaces with the logic component 515 to create each and identify each possible response of the conditional statement (step 815). For example, if gender is female and the person's age is greater than sixty years of age then present the specific pension questions that relate to a female having an age greater that sixty years (FIG. 6, elements 605, 610). Taking a different branch of the conditional statement, for example, if gender is male and the person's age is greater than sixty five years of age then present the specific pension questions that relate to a male having an age greater than sixty five years (FIG. 6, elements 615, 620).

On completion of creating each and every possible permutation of an answer of a conditional statement, the scripting engine 510 constructs the entire data structure that the online application 110 requires in order to continue operating (step 820). Note at this point the data structure has been generated, but not yet executed.

An interceptor component 505, modifies the message into a 'success' message in order for the source code to continue executing (step 825). The source code may take the form of, for example, XML, HTML or JavaScript etc.

The parsing component 515 parses the entire data structure that has been created by the scripting engine 510 and presents the relevant data structure to the user. For example,
PERSON
Enter Gender
Enter Age Depending on the user's answers, the parsing component 510 retrieves the appropriate data set and presents the appropriate data set to the user for entering further information. Each of the user's input answers are stored as variables in a data store 525. As each data structure is presented to the user, the user enters their answer and each of the answers defines which data structure is presented to the user next therefore which path of execution is to be followed. A build component 530 executes along this same execution path populating each of the questions with the user input variables and the offline application continues to execute in the same manner as if it were off-line (step 830).

A data store 525 stores the data which is input into the application 110 by the user. The data maps to variable in the source code. The data store 525 comprises mappings in order to map the data received from the user to the variables listed in the source code in order to identify which data is associated with a variable in the source code. Each mapping comprises a pointer from the data to the variable in the source code.

In another embodiment a probability component 535 determines the probability of whether a particular block of source code will be reached within the execution path. For example, based on a user's response to a particular question, it may be deemed unlikely that a particular branch of the conditional statement will be reached. In this scenario the user will not have to enter the data if it is unlikely that the block of code will be reached. Thus, the user will only need to enter data for the block of code that is most likely to be executed.

Figure 7:
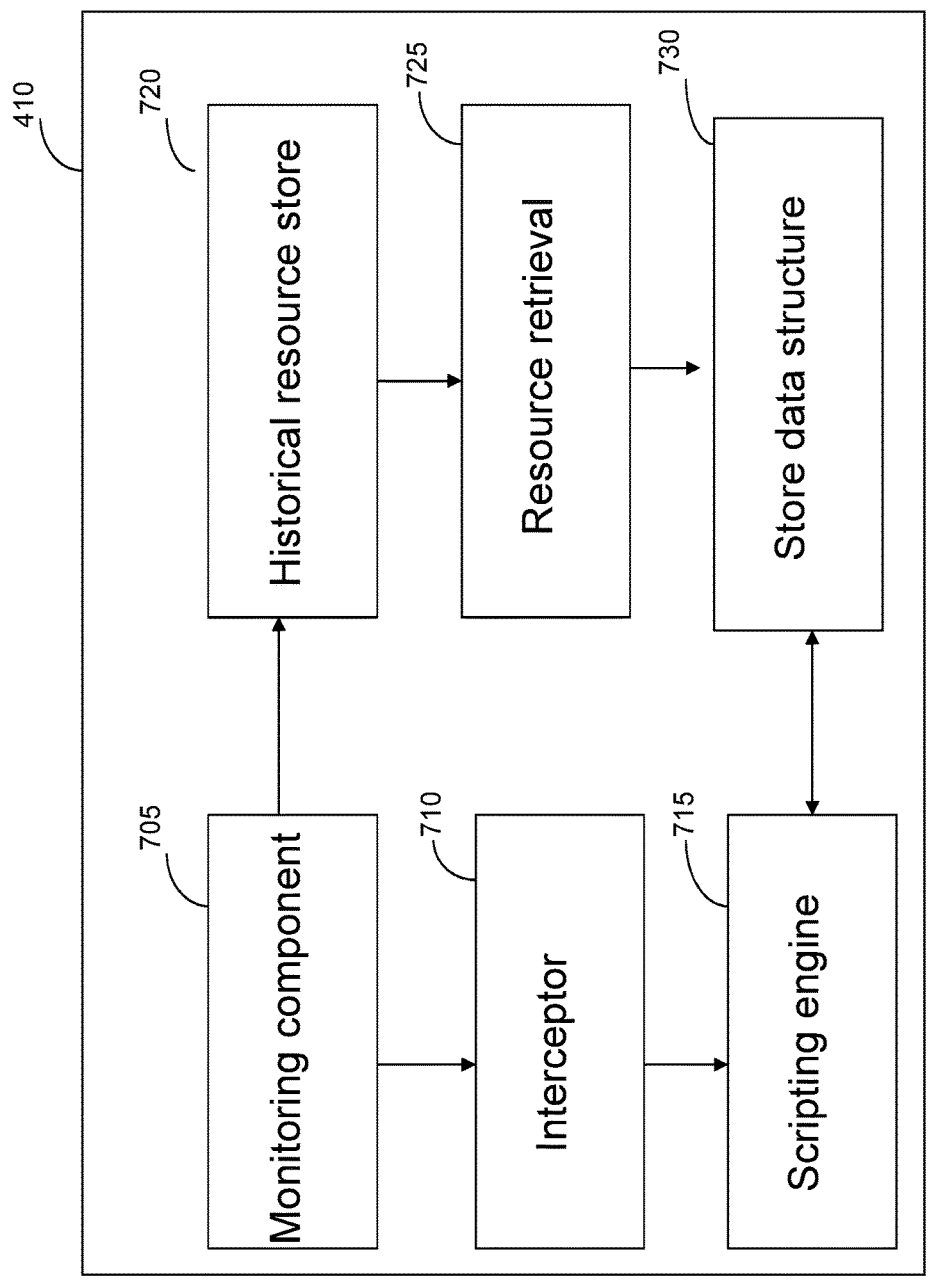
FIG. 7 is a block diagram detailing the components of the empty data structure component, of the predictive data structure creator of FIG. 4, in accordance with a preferred embodiment of the present invention.
Figure 9:
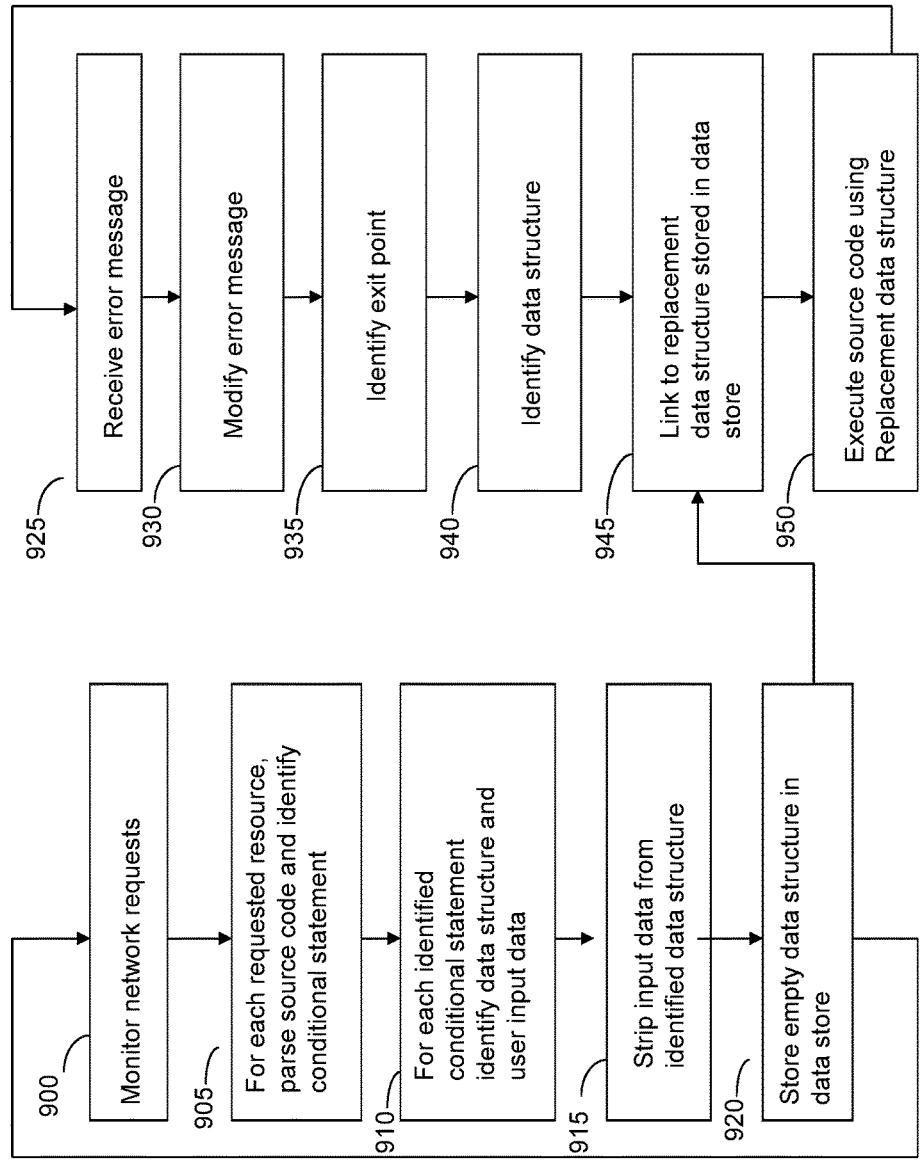
FIG. 9 is a flow chart detailing the process steps of the empty data structure creator in accordance with a preferred embodiment of the present invention.

In an alternative embodiment, and with reference to FIG. 7 and FIG. 9, an empty data structure 410 component monitors a user's online activities in order to build a historical record of data structures for executing when an interceptor component detects there is a loss of network connectivity between the client and the server.

In this example embodiment, a monitoring component 705 monitors a user's online activity and notes when on-line applications 110 are accessed. Identification information such as the URL of the online application 110, the name of the on-line application 110, version number and date of access is stored in the data store 720 (step 900). This information is used to determine if the on-line application 110 has been accessed before in the event of a detection of no network connectivity.

A resource retrieval component 725 monitors the user's interaction with the on-line application 110 and inspects the source code to identify each data structure that is presented to the user or the user interacts with. As before, each conditional statement is monitored and the responses to each of the conditional statements in terms of what data sets are returned are temporally stored in memory by the monitoring component 605 (step 905).

In parallel, a scripting engine 715 parses the data structures and input data and removes the input data from the data structures and stores the empty data structures in the data store 730 (step 915).

Thus, the data store 730 comprises a store of empty data structures and the links and interactions to dependent empty data structures in the data store.

In an alternative embodiment, the user's input data is also stored.

A person skilled in the art will realise that the creation of a data store of empty data structures is built up over a period of time. This is because a user may only use a subset of the set of functionality that an online application is comprised of. Therefore, if an on-line application comprises a set of functionality F1 to Fn, on a first interaction, the user may only use subset F1 and F2. Therefore the empty data structures of subsets F1 and F2 are stored in the data store. On subsequent interactions, the same subsets may be accessed or other not previously accessed subsets may be accessed, for example, F7 to F12. These new subsets are stored in the data store.

When at a later time the user accesses the online application 110, the interceptor component 710 is continually monitoring the status of the network connectivity between the client and the server. When the interceptor component 710 detects that network connectivity has been lost, the interceptor component 710 sends a message to the scripting engine 715 to start rendering and generating the expected execution flow of the application 110 (step 925). The scripting engine 710 determines whether the user has accessed the online application 110 before by inspecting the URL and other identification information.

The scripting engine 715 determines at which point in the execution flow the user lost network connectivity with the server 105 (step 935) and using the empty data structures stored in the data store 730 and recreates the execution path by executing the source code and populating the executing source code with the generated data structures (steps 940 to 950).

In either of the examples above, when the network connectivity detector component detects that network connectivity has been resumed, a message is send to the scripting engine to create a data packet comprising information, such as, at which point in the execution path the processing has reached. The server is able to use this information to continue the execution of the source code through to its conclusion.

The predictive data structure component can also be used to test web based applications before the application is deployed into a networked data processing system. The predictive data structure component is able to generate data structures that are required by the source code in order to continuing executing along an execution path when the application is not network deployed and requested resource can not be fetched from a network connected server. Therefore, transaction sequences that an application is required to work through in order to complete a requested transaction can be validated and tested in an offline environment. In this example, a report may be generated to inform a developer of an execution path that can not complete because of an error in a reference in the source code.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Note that in one or more embodiments, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, as described herein and viewed from a first aspect, the present invention provides a method for generating a predictive data structure for an application when operating offline in a network connected data processing system, the application comprising source code having an execution path, the method comprising the steps of: determining an exit point within the source code of the application; determining from the exit point, an execution path comprising at least one conditional statement; identifying one or more branches of the at least one identified conditional statement and for each identified branch determining an expected response; for each determined expected response, generating a data structure from the response; continuing along the execution path of the source code from the exit point and replacing each request for a resource in the source code with a pointer to the generated data structure; and executing the source code with the pointer to the generated data structure from the determined exit point.

Preferably, the present invention provides a method wherein determining an expected response comprises the step of testing each branch of the conditional statement with one or more logic rules in order to determine the expected response.

Preferably, the present invention provides a method wherein each logic rule comprises a data set for mapping to a variable in the source code of the application and the data set comprises data to be displayed in a window of the network application in response to the input of the variable.

Preferably, the present invention provides a method wherein the exit point is the line of code at which the source code could not execute because of the determined loss of network activity.

Preferably, the present invention provides a method wherein replacing a request for a resource comprises modifying a reference, to a resource on the server, identified in the source code, to reference the generated data structure.

Preferably, the present invention provides a method further comprising executing the source code having the modified references.

Preferably, the present invention provides a method further comprising determining if the client and the server are network connected and in response to a positive determination sending a data packet to the server and the server continuing to execute the source code of the application from the location of the source code where the client handed over processing.

Preferably, the present invention provides a method further comprises monitoring a client's request for resources from a server and determining from the requests a data structure for storing in a historical data store;

Preferably, the present invention provides a method further comprising removing any personal data from the stored data structure.

Viewed from another aspect, the present invention provides an apparatus for generating a predictive data structure for an application when operating offline in a network connected data processing system, the application comprising source code having an execution path, the method comprising the steps of: an interceptor component for determining an exit point within the source code of the application; a scripting engine for determining from the exit point, an execution path comprising at least one conditional statement; a scripting engine for identifying one or more branches of the at least one identified conditional statement and for each identified branch determining an expected response; for each determined expected response, a scripting engine for generating a data structure from the response; a scripting engine for continuing along the execution path of the source code from the exit point and replacing each request for a resource in the source code with a pointer to the generated data structure; and a build component for executing the source code with the pointer to the generated data structure from the determined exit point.

Preferably, the present invention provides an apparatus wherein determining an expected response comprises the step of testing each branch of the conditional statement with one or more logic rules in order to determine the expected response.

Preferably, the present invention provides an apparatus wherein each logic rule comprises a data set for mapping to a variable in the source code of the application and the data set comprises data to be displayed in a window of the network application in response to the input of the variable.

Preferably, the present invention provides an apparatus wherein the exit point is the line of code at which the source code could not execute because of the determined loss of network activity.

Preferably, the present invention provides an apparatus wherein replacing a request for a resource comprises modifying a reference, to a resource on the server, identified in the source code, to reference the generated data structure.

Preferably, the present invention provides an apparatus further comprises executing the source code having the modified references.

Preferably, the present invention provides an apparatus further comprising a network connectivity detector for determining if the client and the server are network connected and in response to a positive determination sending a data packet to the server and the server continuing to execute the source code of the application from the location of the source code where the client handed over processing.

Preferably, the present invention provides an apparatus further comprises a monitoring component for monitoring a client's request for resources from a server and determining from the requests a data structure for storing in a historical data store;

Preferably, the present invention provides an apparatus further comprising removing any personal data from the stored data structure.

Viewed from another aspect, the present invention provides a method for testing a network application when the network application is not connected to a network, the network application operable for communicating with a server across a network, the application comprising source code having an execution path, the method comprising the steps of: determining an exit point within the source code of the application; determining from the exit point, an execution path comprising at least one conditional statement; identifying one or more branches of the at least one identified conditional statement and for each identified branch determining an expected response; for each determined expected response, generating a data structure from the response; continuing along the execution path of the source code from the exit point and replacing each request for a resource in the source code with a pointer to the generated data structure; executing the source code with the pointer to the generated data structure from the determined exit point.

Viewed from another aspect, the present invention provided a computer program comprising computer program code for, when loaded into a computer system and executed; performing all the steps of the invention as described above.

Improvements and modifications can be made to the foregoing without departing from the scope of the present invention.

What is claimed is:

1. A method for generating a predictive data structure for an application when operating offline in a network connected data processing system, the application comprising source code having an execution path, the method comprising:
    determining an exit point within the source code of the application, wherein the exit point is a line of code at which the source code could not execute because of a determined loss of network activity;
    determining, from the exit point, at least one prior conditional statement preceding the exit point;
    identifying one or more branches of the at least one prior conditional statement;
    determining, for each respective branch, a respective data element associated with the at least one prior conditional statement and corresponding to a respective branch of the at least one prior conditional statement;
    generating a data structure for the at least one prior conditional statement containing each respective determined data element;
    replacing the at least one prior conditional statement with a pointer to the generated data structure for the at least one prior conditional statement;
    determining from the exit point, an execution path comprising at least one conditional statement;
    identifying one or more branches of the at least one identified conditional statement and for each identified branch determining an expected response;
    for each determined expected response, generating a data structure from the response;
    continuing along the execution path of the source code from the exit point and replacing each request for a resource in the source code with a pointer to the generated data structure; and
    executing the source code with the pointer to the generated data structure from the determined exit point.

2. The method of claim 1, wherein determining an expected response comprises testing each branch of the conditional statement with one or more logic rules in order to determine the expected response.

3. The method of claim 2, wherein each logic rule comprises a data set for mapping to a variable in the source code of the application and the data set comprises data to be displayed in a window of the application in response to the input of the variable, and wherein the variable comprises a selected data element from a set of data elements, wherein the set of data elements are retrieved from the one or more branches of the at least one identified conditional statement.

4. The method of claim 1, wherein replacing the request for the resource comprises modifying a reference, to a resource on the server, identified in the source code, to reference the generated data structure.

5. The method of claim 4, further comprising executing the source code having the modified references.

6. The method of claim 1, further comprising determining if the client and the server are network connected and in response to a positive determination sending a data packet to the server and the server continuing to execute the source code of the application from the location of the source code where the client handed over processing.

7. The method of claim 1, further comprising monitoring a client's request for resources from a server and determining from the requests a data structure for storing in a historical data store.

8. The method of claim 7, further comprising removing any personal data from the stored data structure.

9. An apparatus for generating a predictive data structure for an application when operating off-line in a network connected data processing system, the application comprising source code having an execution path, the apparatus comprising a memory and a processor configured to perform a method comprising:
    determining an exit point within the source code of the application, wherein the exit point is a line of code at which the source code could not execute because of a determined loss of network activity;
    determining, from the exit point, at least one prior conditional statement preceding the exit point;
    identifying one or more branches of the at least one prior conditional statement;
    determining, for each respective branch, a respective data element associated with the at least one prior conditional statement and corresponding to a respective branch of the at least one prior conditional statement;
    generating a data structure for the at least one prior conditional statement containing each respective determined data element;
    replacing the at least one prior conditional statement with a pointer to the generated data structure for the at least one prior conditional statement;
    determining from the exit point, an execution path comprising at least one conditional statement;
    identifying one or more branches of the at least one identified conditional statement and for each identified branch determining an expected response;
    for each determined expected response, generating a data structure from the response;
    continuing along the execution path of the source code from the exit point and replacing each request for a resource in the source code with a pointer to the generated data structure; and
    executing the source code with the pointer to the generated data structure from the determined exit point.

10. The apparatus of claim 9, wherein determining an expected response comprises the step of testing each branch of the conditional statement with one or more logic rules in order to determine the expected response.

11. The apparatus as claimed in claim 10, wherein each logic rule comprises a data set for mapping to a variable in the source code of the application and the data set comprises data to be displayed in a window of the network application in response to the input of the variable, and wherein the variable comprises a selected data element from a set of data elements.

12. The apparatus as claimed in claim 11, wherein the set of data elements are retrieved from the one or more branches of the at least one identified conditional statement.

13. A computer program product comprising computer program code stored in a computer readable storage medium, wherein the computer readable storage medium does not comprise a transitory signal per se, and wherein the computer program product is configured to, when loaded into a computer system and executed by a processor, perform all the steps of a method comprising:
   determining an exit point within the source code of the application, wherein the exit point is a line of code at which the source code could not execute because of a determined loss of network activity;
   determining, from the exit point, at least one prior conditional statement preceding the exit point;
   identifying one or more branches of the at least one prior conditional statement;
   determining, for each respective branch, a respective data element associated with the at least one prior conditional statement and corresponding to a respective branch of the at least one prior conditional statement;
   generating a data structure for the at least one prior conditional statement containing each respective determined data element;
   replacing the at least one prior conditional statement with a pointer to the generated data structure for the at least one prior conditional statement;
   determining from the exit point, an execution path comprising at least one conditional statement;
   identifying one or more branches of the at least one identified conditional statement and for each identified branch determining an expected response;
   for each determined expected response, generating a data structure from the response;
   continuing along the execution path of the source code from the exit point and replacing each request for a resource in the source code with a pointer to the generated data structure; and
   executing the source code with the pointer to the generated data structure from the determined exit point.

14. The computer program product of claim 13, wherein the processor is configured to perform a method further comprising:
   determining that the client has handed over processing of the source code to the server;
   determining if the client and the server are network connected; and
   in response to a positive determination that the client and server are network connected, sending a data packet to the server, wherein the server continues to execute the source code of the application from a location of the source code at which the client handed over processing of the source code.

15. The computer program product of claim 13, wherein the processor is configured to perform a method further comprising:
   monitoring a client's request for resources from a server; and
   determining, from the client's request, a data structure for storing in a historical data store.

16. The computer program product of claim 15, wherein the processor is configured to perform a method further comprising:
   removing any personal data from the data structure that is stored in the historical data store.

* * * * *